United States Patent [19]

Masaki et al.

[11] 4,195,263
[45] Mar. 25, 1980

[54] SELECTIVE CALL RADIO COMMUNICATION RECEIVER

[75] Inventors: Masaru Masaki; Akio Yotsutani, both of Tokyo, Japan

[73] Assignee: Nippon Electric Co., Ltd., Tokyo, Japan

[21] Appl. No.: 845,744

[22] Filed: Oct. 26, 1977

[30] Foreign Application Priority Data

Oct. 29, 1976 [JP] Japan .................. 51-146416[U]

[51] Int. Cl.² .................................... H04B 1/06
[52] U.S. Cl. ............................................ 455/343
[58] Field of Search ............... 325/492, 493, 185, 186, 325/364, 466, 55, 64, 395, 396

[56] References Cited

U.S. PATENT DOCUMENTS

| | | | |
|---|---|---|---|
| 2,884,518 | 4/1959 | O'Neill | 325/492 |
| 3,142,801 | 7/1964 | Konig et al. | 325/492 |
| 3,611,156 | 10/1971 | Ward | 325/492 |
| 3,737,786 | 6/1973 | McDermott et al. | 325/492 |
| 3,774,114 | 11/1973 | Dahlgren | 325/492 |
| 3,996,581 | 12/1976 | Brodeur et al. | 325/492 |

*Primary Examiner*—Robert L. Griffin
*Assistant Examiner*—Jin F. Ng
*Attorney, Agent, or Firm*—Sughrue, Rothwell, Mion, Zinn and Macpeak

[57] ABSTRACT

A paging or like radio communication receiver is disclosed having a crystal oscillator circuit which is connected directly with a power source and is thus held continuously in oscillation at its preset level of frequency irrespective of whether the power supply ON/OFF switch is closed or not. The novel arrangement enables the receiver to produce a normal quality call sound whenever the swtich is closed and the proper signal is received, even at the instant of its start, and substantially extends the service life of the battery.

1 Claim, 2 Drawing Figures

SELECTIVE CALL RADIO COMMUNICATION RECEIVER

BACKGROUND OF THE INVENTION

This invention relates to selective call radio communication receivers such as pocket bells and is intended to provide a novel power supply system therefor.

For radio receivers of this kind, a digital transmission system which employs digital channel signals as formed by FSK (Frequency Shift Keying) modulation is usable in place of the conventional tone system, for which reference is made, for example, to the U.S. Pat. No. 3,651,413, issued Mar. 21, 1972, to K. H. Wycoff.

Receivers usable with such transmission system are constituted principally of a radio receiver circuit, a decoder circuit, a low-frequency amplifier circuit, a loudspeaker, a clock oscillator and a battery. The FSK signal input received through an antenna is demodulated into the radio receiver circuit and directed therefrom to the decoder circuit. The decoder circuit, being fed with the demodulated signal, decides whether the selecting signal for the receiver station has been received or not and, upon deciding that such signal has been received, acts to drive the low frequency amplifier. The output of the amplifier is directed to the loudspeaker, thus causing the latter to produce a call sound. As is generally known, the oscillator circuit includes such components as a resistor, an amplifier, a capacitor and a quartz oscillator and outputs clock pulses to the decoder circuit, which produces different timing signals required for receiver operation by frequency-dividing the clock output of the oscillator circuit. The frequency of the call sound can also be formed by frequency division of the clock. The battery is connected through a source switch with the receiver components, including the oscillator circuit. With this conventional arrangement, the oscillator circuit is inoperative as long as the power supply switch is open and starts oscillation only when the switch is closed.

In this connection, where the oscillator unit used is a quartz oscillator of the order of 30 KHz, having an equivalent resistance as high as several tens of kiloohm, it takes several seconds following application of power for the oscillations to attain the normal oscillating frequency. On the other hand, a selective call radio receiver such as a paging receiver is generally designed so as to enable the user to test its operation characteristics by closing the power supply switch thereby to produce a call sound. With radio receivers of the latter kind, however, the lapse of substantial time between the switch closing and the actual start of the call sound is a serious disadvantage. In this connection, another disadvantage is that until the normal frequency is reached the sound produced is unusual and offensive to the ear. Further, recent receiver models include a single cell as a power supply source with a source voltage on the order of 1.0 V to 1.5 V. On the other hand, the voltage required to render a crystal oscillator circuit operative is higher than the voltage at which the oscillator, once operating, is rendered inoperative, and often amounts to about 1.3 V. This apparently means that with such conventional receiver the battery becomes useless before its voltage falls down to the level at which oscillation would otherwise cease. In other words, such receiver has the further disadvantage that the service life of the battery in effect expires when its voltage is still at a relatively high level.

SUMMARY OF THE INVENTION

The present invention has for its object the provision of a selective call radio communication receiver which is free from the disadvantages previously encountered as described above and, to attain this objective, proposes a novel power supply system for the communication receiver.

According to the present invention, there is provided a selective call radio communication receiver of the type including a radio receiver circuit adapted to demodulate the radio selecting signal received, a decoder circuit for decoding the demodulated selecting signal, a crystal oscillator circuit for producing different timing signals and a battery, which receiver is characterized in that at least said crystal oscillator circuit is at all times held energized with said battery directly connected thereto while said radio receiver circuit is connected with said battery by switch means when required.

The above and other objects, features and advantages of the present invention will become apparent from the following description taken in conjunction with the accompanying drawings.

DETAILED DESCRIPTION OF THE PREFERRED EMBODIMENTS

Figure 1:
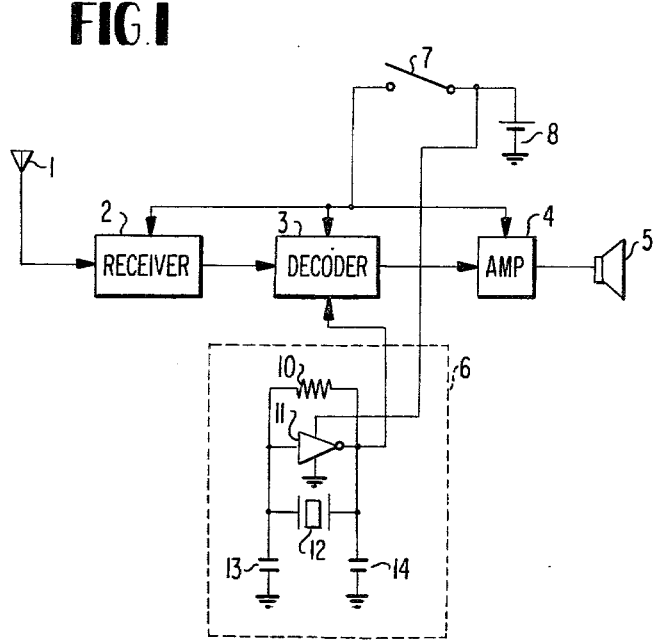
FIG. 1 is a block diagram of a selective call radio communication receiver embodying the present invention.

Referring to FIG. 1, which illustrates one preferred embodiment of the present invention, reference numeral 1 indicates an antenna; 2, a radio receiver circuit; 3, a decoder; 4, low-frequency amplifier; 5, a speaker; 6, an oscillator circuit; 7, a power source switch; and 8, a battery. The oscillator circuit 6 consists of a resistor 10, an amplifier 11, a quartz oscillator 12 and capacitors 13 and 14. The component circuits of the receiver illustrated are each basically of the generally known form but, unlike any previous forms of radio receiver of the kind described, the power supply system of the receiver is arranged with the oscillator circuit 6 connected directly with the battery 8 but not through the medium of source switch 7. The battery 8 is connected with the radio receiver circuit 2, decoder circuit 3 and low-frequency amplifier 4 through the switch 7, as is the case with previous receivers.

With the arrangement illustrated, it will be noted that the clock oscillator circuit 6 starts oscillation as soon as the battery 8 is placed in the receiver and the oscillations, once started, continue irrespective of whether the switch 7 is held closed or not. Circuit connection and operation of the components other than the oscillator circuit 6 are the same as those of conventional receivers.

With the arrangement of the present invention, the service life of the battery is lengthened to a substantial extent, as will be described below.

For ordinary paging receivers, it is assumed here that the lengths of ON/OFF periods of the power source are 10/14 hours per day, the average battery current during the ON period is 500 $\mu$A, the battery capacity is 500 mA-hr, the current flowing in the clock oscillator circuit is 2 $\mu$A. Under this assumption, the current consumption per day is 5 mA-hr, giving a battery life of (500 mA-hr)/(5 mA-hr/day)=100 days. The current consumption of the clock oscillator circuit when continuously held energized is 48 μA-hr/day, which corresponds only to about 1% of the battery life, one day, thus having no substantial influence upon the battery life. Further, the difference between the voltage at which oscillation is started and that at which it ceases is 0.3 V on the average, corresponding to 60 mA-hr and (60 mA-hr)/(5 mA=hr/day)=12 days. Accordingly, with the power supply system of the present invention, the battery life is extended equivalently by the length of 12−1=11 days.

Figure 2:
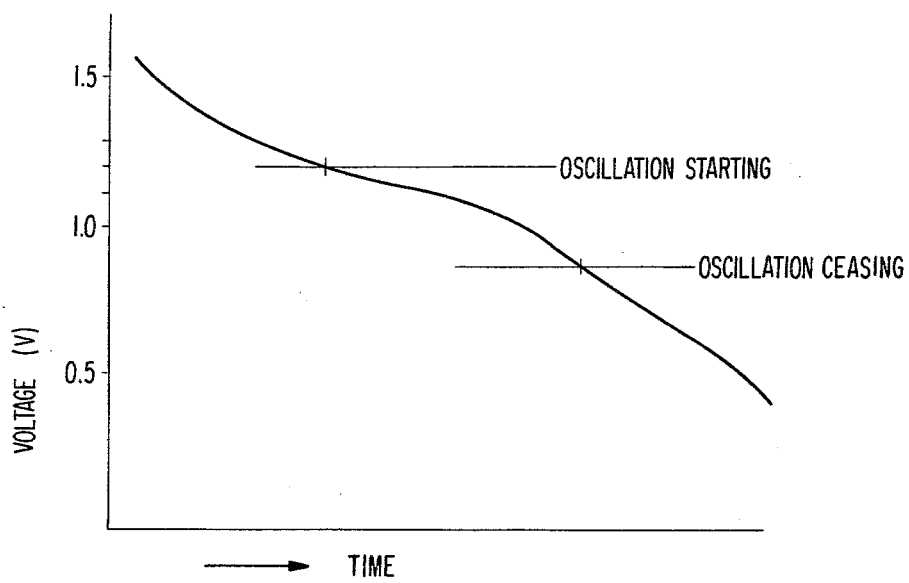
FIG. 2 graphically illustrates the voltage-drop characteristic of the battery employed in the receiver.

It will be apparent with the circuit arrangement of the present invention, in which the oscillator circuit 6 remains operative irrespective of whether the switch 7 is closed or open, the call sound is produced at the instant when the source switch 7 is closed, thus enabling the user to test his receiver quite efficiently whenever desired. In addition, the oscillation is at the normal frequency from the start and never causes any unusual or offensive sound. The oscillator circuit itself is ordinarily started at the very instant a battery is placed in the receiver, and that battery will usually be a fresh unit having a voltage substantially higher than that required for the oscillator circuit to start oscillation. Moreover, according to the present invention, the oscillation, once started upon insertion of a battery, is not interrupted even when the source switch 7 is opened and, unless the battery is replaced, is maintained until the battery voltage falls to a level at which the oscillation can no longer be sustained. Such voltage level is much lower than the level required for the oscillator to start oscillation. This means that, according to the present invention, the usable voltage range of the battery is extended down to a voltage level at which the oscillator circuit ceases to oscillate. The diagram of FIG. 2 illustrates how the service life of the battery is extended in this manner according to the present invention.

Though, in the above embodiment, only the oscillator circuit 6 is connected directly with the battery 8 with no intervention of switch 7, part or all of the decoder circuit 3 may also be connected directly with the battery 8 in cases where the circuit 3 is comprised of a CMOS or the like, requiring only a very limited current supply.

It will be appreciated from the foregoing description that, according to the present invention, not only the call sound characteristics of the radio communication receiver are materially improved particularly in connection with the closing of the power source switch but also the service life of the battery is in effect substantially extended, making it possible to keep the battery in use until its voltage reaches a relatively low level.

What is claimed is:

1. A selective call radio communication receiver of the type including a radio receiver circuit adapted to demodulate the radio frequency selecting signal received, a decoder circuit for decoding the demodulated selecting signal, a crystal oscillator circuit connected to the decoder circuit for producing different timing functions, and a battery, the improvement comprising:
    connection means directly and continuously connecting at least said crystal oscillator circuit with said battery; and
    switch means for selectively connecting the radio receiver circuit with said battery, said switch means being switchable between a first position in which said receiver is inoperable and a second position in which said receiver is operable, said crystal oscillator circuit being energized at all times regardless of the position of said switch means.

* * * * *